Figure 1:
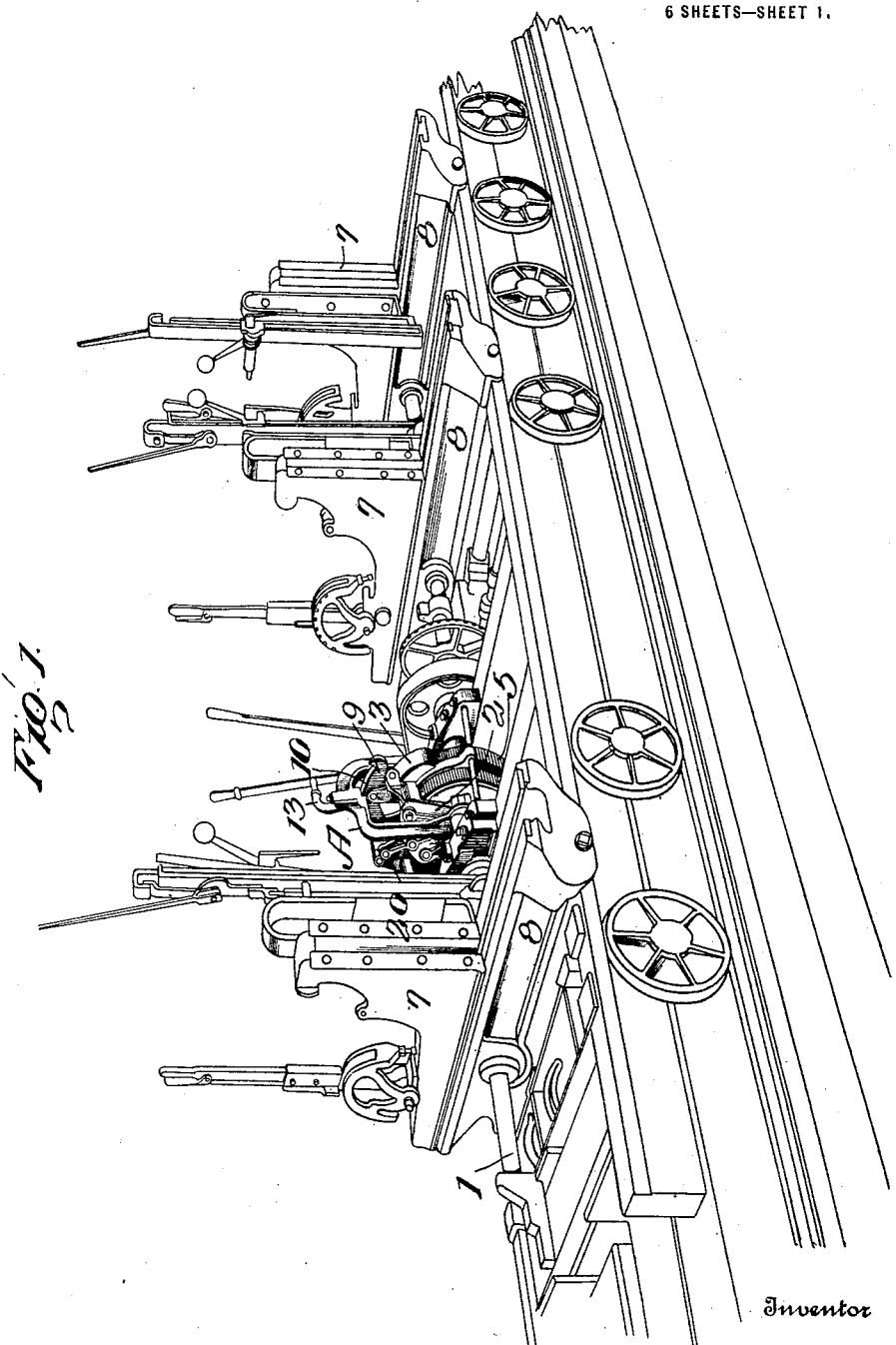
Figure 2:
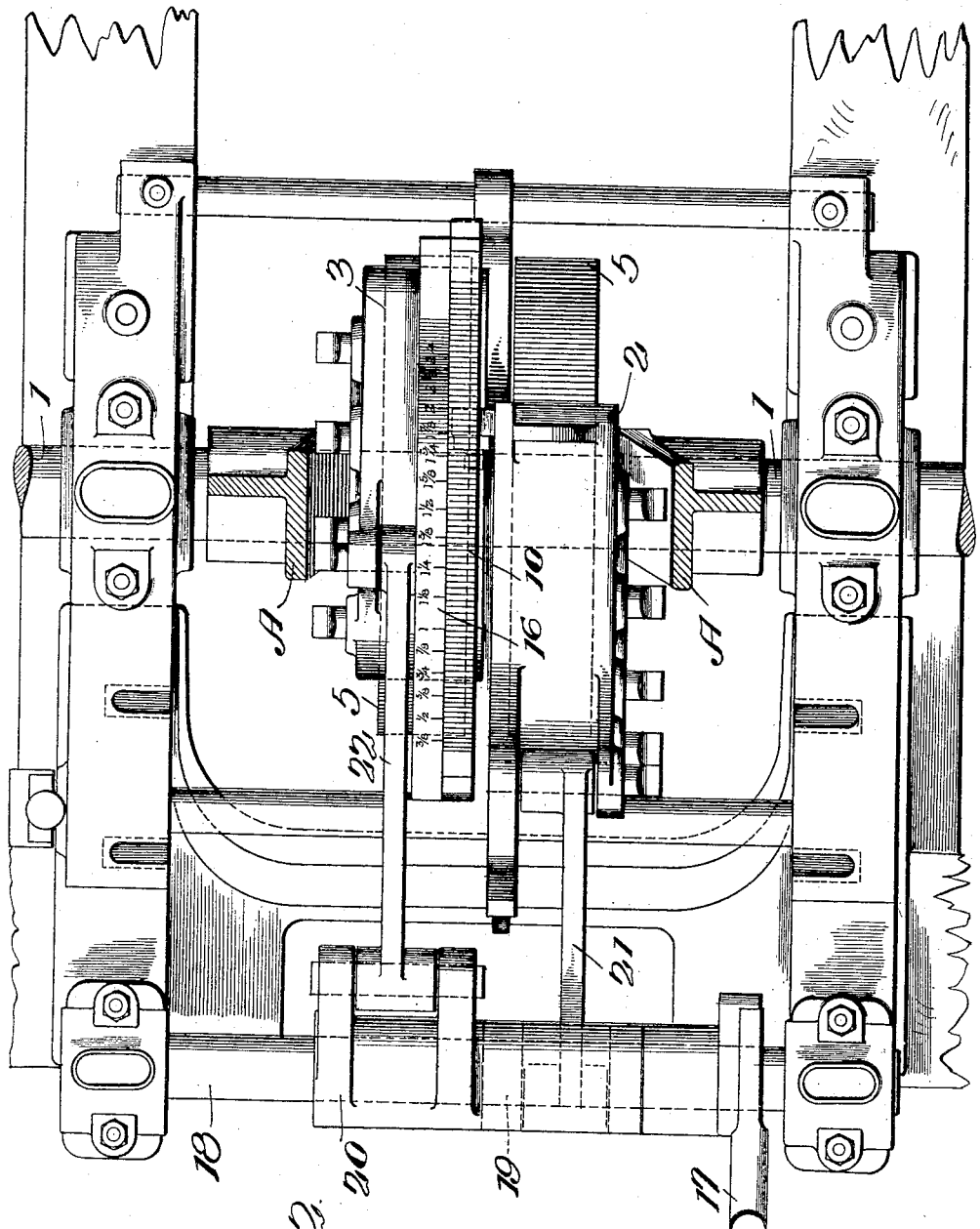
Figure 3:
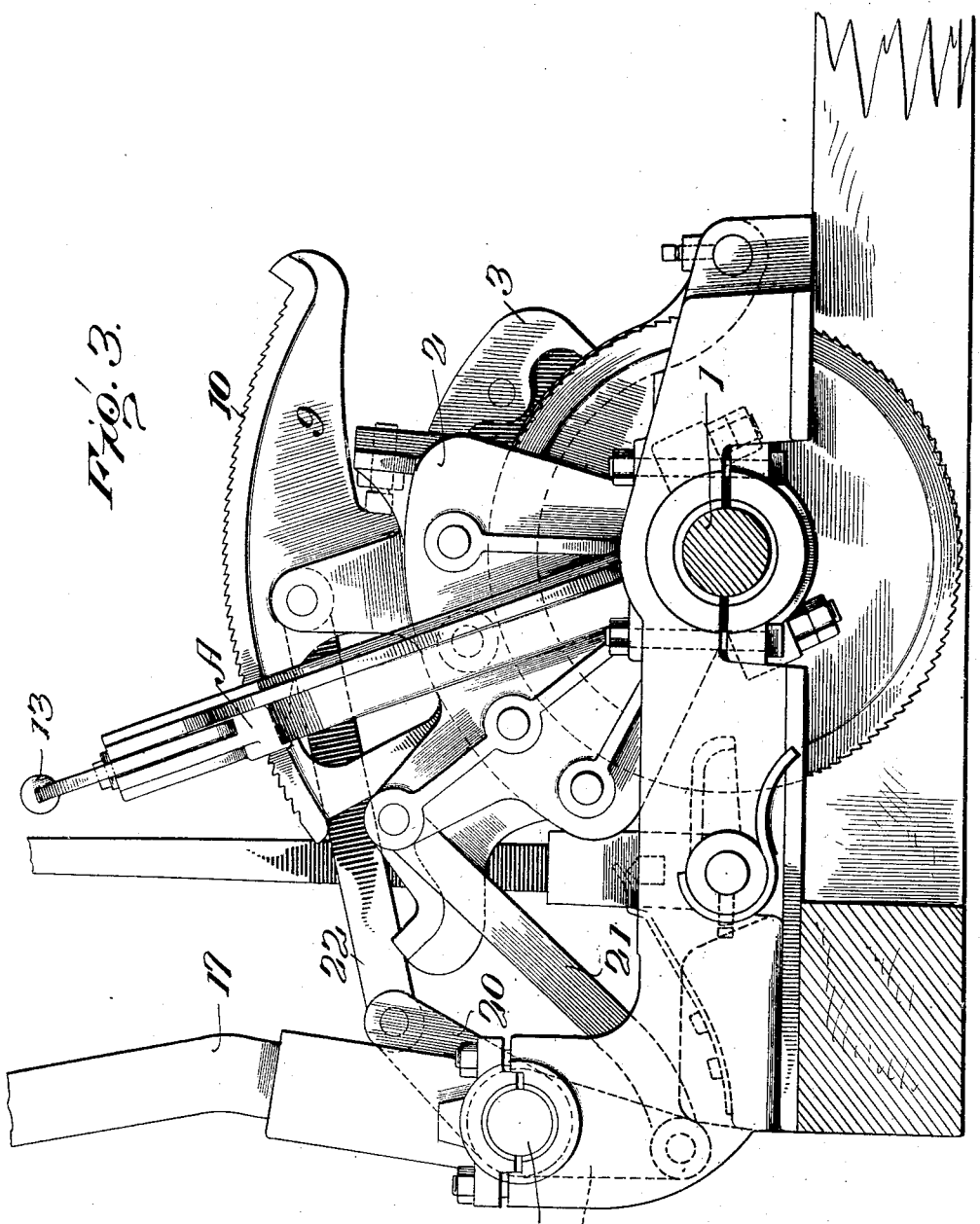
Figure 4:
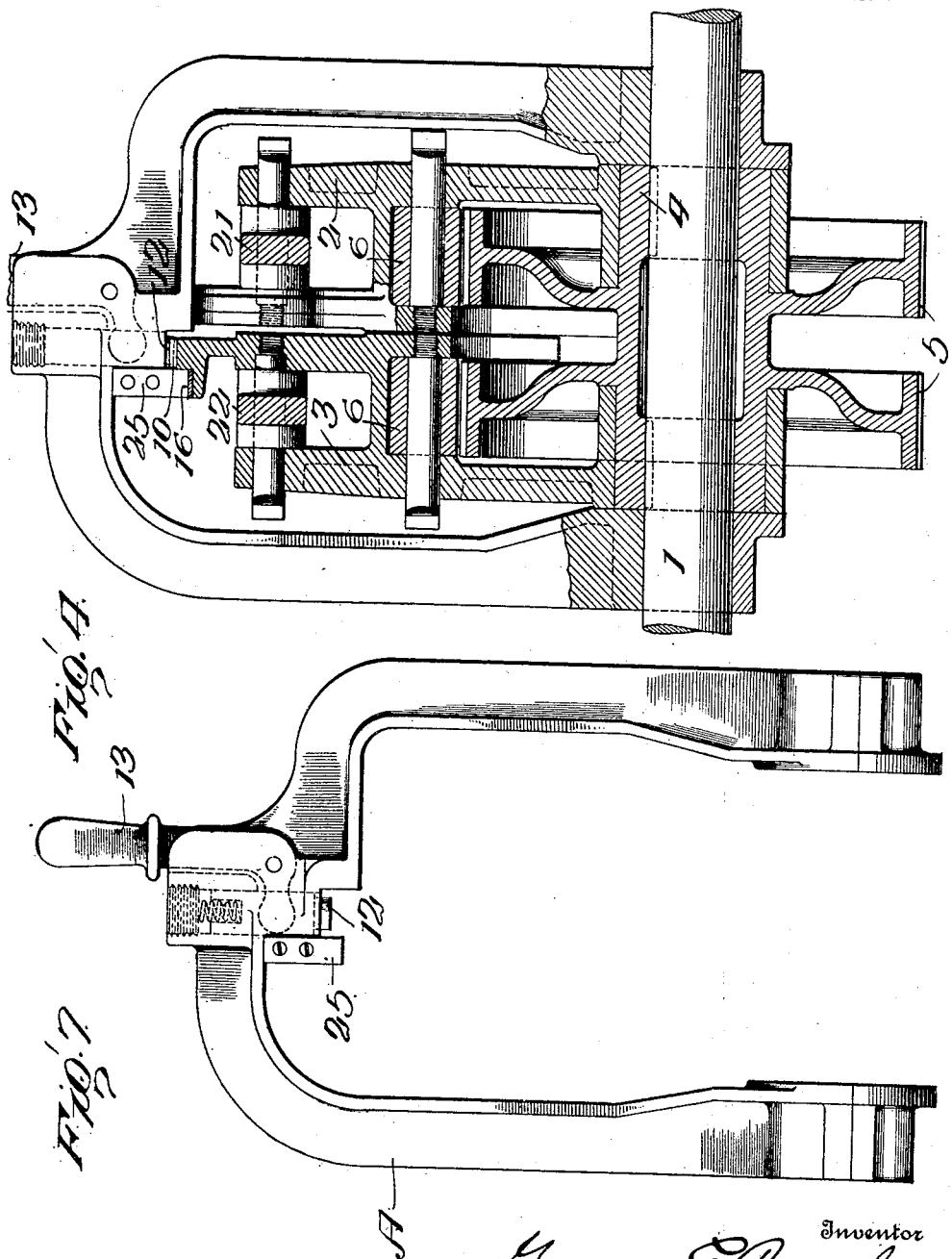
Figure 5:
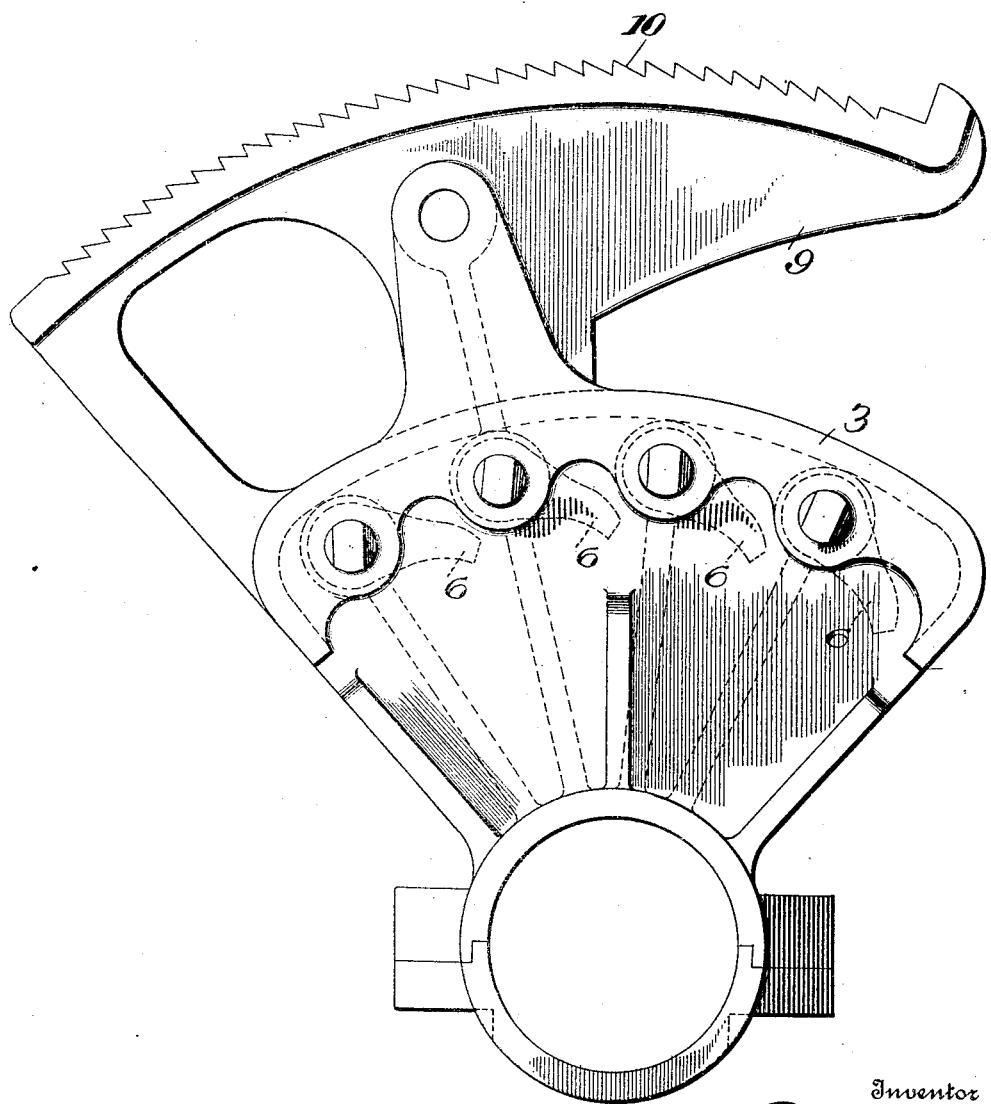
Figure 6:
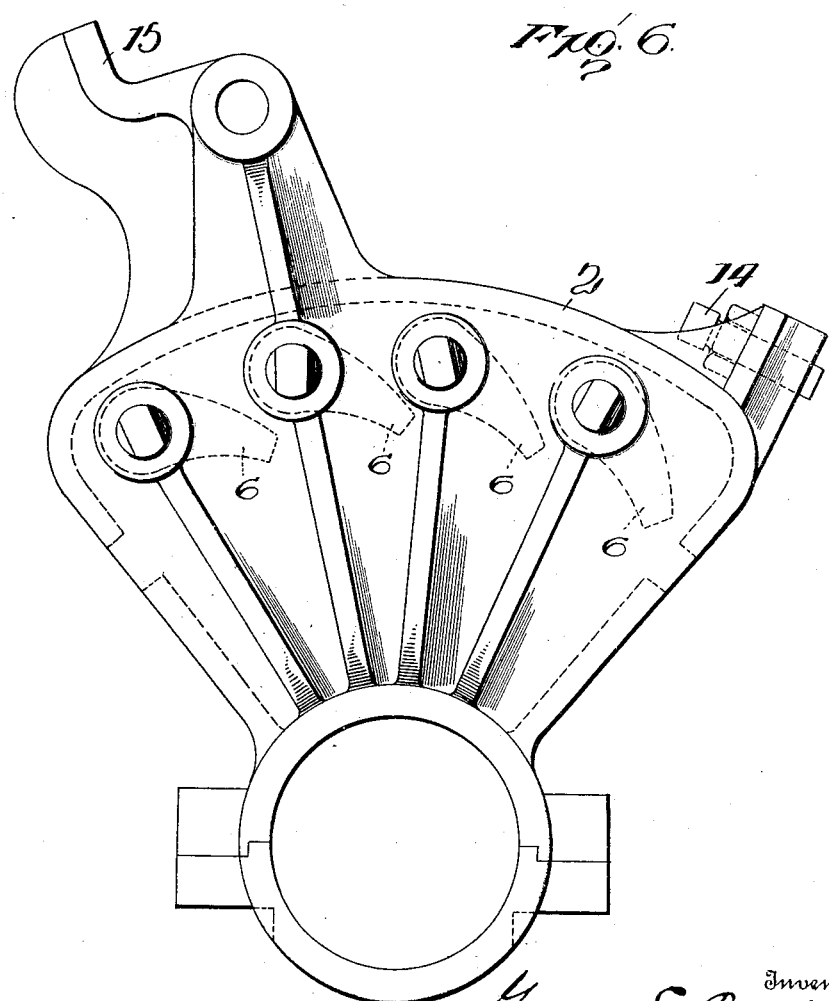

G. E. CAMPBELL.
SAWMILL SET WORKS.
APPLICATION FILED DEC. 24, 1915.

1,198,378.

Patented Sept. 12, 1916.
6 SHEETS—SHEET 1.

G. E. CAMPBELL.
SAWMILL SET WORKS.
APPLICATION FILED DEC. 24, 1915.

1,198,378.

Patented Sept. 12, 1916.
6 SHEETS—SHEET 6.